United States Patent Office 3,404,171
Patented Oct. 1, 1968

3,404,171
PREPARATION OF ALKYL ISOTHIOCYANATES
Henri Ulrich, North Branford, Conn., assignor to The Upjohn Company, Kalamazoo, Mich., a corporation of Delaware
No Drawing. Filed Sept. 27, 1965, Ser. No. 490,704
12 Claims. (Cl. 260—454)

ABSTRACT OF THE DISCLOSURE

Alkyl (1–12 C atoms) isothiocyanates are prepared by treating the corresponding alkylamine salt of the N-alkyldithiocarbamic acid with phosgene at 0° C. to 20° C. and heating the resulting mixture at 40° C. to 120° C. The alkylamine salts of N-alkyldithiocarbamic acid employed as starting materials can be preformed or formed in situ by reaction of carbon disulfide and the corresponding alkylamine in the molar ratio of 1:2 in an inert solvent. The alkyl isothiocyanates so obtained are known compounds useful as nematocides and insecticides.

---

This invention relates to a novel process for the synthesis of isothiocyanates and is more particularly concerned with a novel process for the conversion of alkylamines to the corresponding alkyl isothiocyanates.

A variety of methods for the synthesis of alkyl isothiocyanates has been described in the literature; see, for example, the review by Slotta et al., Berichte, 63, 888, 1930. Most of these methods involve the use of the corresponding alkylamine as starting material, and one such method which has been widely used, with modifications, is that of Kaluza, Monatsh. Chem., 33, 364, 1912. This method essentially comprises reacting the corresponding hydrocarbylamine with carbon disulfide in the presence of an alkali metal hydroxide to obtain the corresponding alkali metal N-hydrocarbyl dithiocarbamate, reacting the latter with ethyl chlorocarbonate to obtain the corresponding carbethoxy N-hydrocarbyl dithiocarbamate and cleaving the latter by treatment with alkali metal hydroxide to give the desired isothiocyanate.

The above method requires a number of steps in the overall conversion of hydrocarbylamine to hydrocarbyl isocyanate with isolation of intermediates at each stage. The problems encountered with this and other prior art methods are discussed by Ettlinger et al., J. Org. Chem., 21, 404, 1956, who, nevertheless, preferred the Kaluza method to other prior art methods.

I have now found that alkylamines can be converted to the corresponding alkyl isothiocyanates in good yield and without the necessity to isolate intermediates produced in the process. The process of my invention can be used on the manufacturing scale and offers advantages in economy of labor and materials over prior art methods hitherto employed.

The process of my invention for the preparation of an alkyl isothiocyanate comprises reacting the corresponding alkylamine with carbon disulfide in the presence of an inert organic solvent, the molar ratio of alkylamine to carbon disulfide employed in said reaction being approximately 2:1, treating the reaction product so obtained with phosgene at a temperature of about 0° C. to about 20° C. the amount of phosgene employed being within the range of about 1.0 to about 1.2 moles for each 2 moles of alkylamine employed in the first step, and heating the reaction product so obtained at a temperature within the range of about 40° C. to about 120° C. to obtain the desired alkyl isothiocyanate.

The term "alkyl" as used throughout this specification means alkyl containing from 1 to 12 carbon atoms, inclusive, such as methyl, ethyl, propyl, butyl, pentyl, hexyl, heptyl, octyl, nonyl, decyl, undecyl, dodecyl, and isomeric forms thereof.

The reactions occurring during the process of the invention are shown schematically as follows. It is to be understood that the following equations are given for purposes of explanation only in order to facilitate an understanding of the process of the invention. The reactions shown in the equations are not to be interpreted in any way as limiting or modifying the scope of this invention. The reactions which are believed to occur in the process of the invention are as follows:

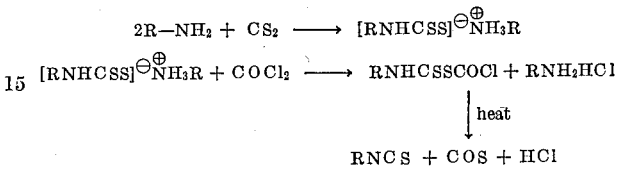

In the above equations R represents alkyl as hereinbefore defined.

The above equations are largely self-explanatory. It will be seen that for every 2 moles of starting alkylamine one mole is involved in salt formation i.e. forms the alkylamine salt of the N-alkyldithiocarbamic acid produced in the initial reaction with carbon disulfide, and is eventually recovered, as will be described in more detail hereafter, as its hydrochloride in the second or third step of the reaction. The various reactions shown above can be carried out in sequence without the need to isolate intermediates. This and other advantages of the process of the invention will become more apparent from the discussion which follows.

In carrying out the process of the invention the alkylamine employed as starting material is reacted with carbon disulfide to form the corresponding N-alkyldithiocarbamic acid. By using approximately 2 moles of alkylamine for each mole of carbon disulfide the N-alkyldithiocarbamic acid is obtained in the form of its salt with the alkylamine. Preferably the amount of alkylamine employed in the reaction is of the order of at least 2 moles per mole of carbon disulfide; amounts of alkylamine in excess of this proportion can be employed if desired but offer no advantages in the way of rate or yield of reaction.

The reaction between the carbon disulfide and the alkylamine is preferably carried out in the presence of an inert organic solvent i.e. an organic solvent which does not enter into reaction with, or interfere in any way with, any of the reactants used in this stage of the process of the invention or in subsequent stages thereof. Examples of inert organic solvents are benzene, toluene, xylene, chlorobenzene, 1,2-dichlorobenzene, 1,3,4-trichlorobenzene, petroleum ether, ligroin, pentane, hexane, octane, methylene dichloride, ethyl chloride, chloroform, tetrachloroethane, and the like.

In carrying out this first stage of the process of the invention the alkylamine is added to the carbon disulfide, rather than vice versa. In a preferred embodiment the amine, either as such or as a solution in inert organic solvent, is added to a solution of carbon disulfide in inert organic solvent and the addition is made at such a rate that the temperature of the reaction mixture can be maintained with the aid of external cooling, at a value not higher than about 50° C. The amount of inert organic solvent employed in the above process is not critical. Generally speaking it is convenient to employ an amount of solvent such that the total amount of reactants present represent from about 5% to about 25% by weight. These limits are not critical and higher or lower concentrations of reactants can be employed in particular cases.

Where the alkylamine employed as starting material is soluble in water, particularly in the case of methylamine which is conventionally available as a concentrated aqueous solution, a variation in the above-described procedure for the first stage of the reaction can be employed. In this variation the amine is added as an aqueous solution to the carbondisulfide and the reaction product is isolated by filtration or the water is removed from the resulting reaction product by azeotropic distillation using an inert organic solvent such as benzene, toluene, and the like to give a resulting reaction mixture containing the alkylamine salt of the N-alkyldithiocarbamic acid in an inert organic solvent which mixture can be subjected to the second stage of the process as described below.

In the second stage of the process of the invention the reaction mixture from the first step as described above is treated with phosgene. Advantageously and preferably the reaction mixture from the above first step is used as such and is not subjected to any further treatment such as partial purification or isolation of the amine salt of the N-alkyldithiocarbamic acid before the treatment with phosgene is undertaken. The reaction with phosgene is carried out advantageously at a temperature within the range of about 0° C. to about 20° C. and preferably within the range of about 5° C. to about 10° C. The phosgene is added in gaseous form or in solution in an inert organic solvent, in accordance with procedures conventional in the art, for example, by bubbling in the desired amount of phosgene at any desired rate. The amount of phosgene employed is preferably within the range of about 1.0 to about 1.2 moles for every 2 moles of alkylamine employed in the first stage of the process. Lower amounts of phosgene can be employed but have a deleterious effect on the overall yield of isothiocyanates. A proportion of phosgene higher than the above upper limit can be employed if desired but contributes nothing in the way of increase in yield or reaction time to the process of the invention.

When the addition of the desired amount of phosgene to the amine salt of the N-alkyldithiocarbamate is complete the reaction mixture so obtained in this second stage of the process is then subjected to the third and final stage of the process. If desired, the amine hydrochloride which has separated during this second stage of the process can be removed at this point, for example, by filtration, or can be allowed to remain in the reaction mixture during the final stage of the process and be removed as described below during the working up of the final reaction mixture.

This final stage of the process comprises heating the reaction mixture obtained in the second stage to a temperature within the range of about 40° C. to about 120° C. The desired reaction temperature can be achieved in a convenient manner by choosing as inert organic solvent employed in the process of the invention one which has a boiling point at the desired reaction temperature. In this way the third stage of the process can be accomplished readily by heating to reflux the reaction mixture obtained in the second stage of the process of the invention.

The heating step results in liberation of the desired alkyl isothiocyanate together with corresponding molar proportions of hydrogen chloride and carbonyl sulfide. The evolution of the latter gases serves as a useful guide to the progress of third and final stage of the process of the invention. Thus the completion of the reaction is marked by the cessation of gas evolution. The completion of the reaction may take from the order of a few minutes to several hours depending upon the particular reactants and the temperature at which this third stage of the process is conducted.

As noted previously, a by-product of the process of the invention is the hydrochloric acid salt of the starting alkyl-amine, approximately 1 mole of this hydrochloride being formed for each mole of alkylamine which is converted to isothiocyanate. The hydrochloride generally separates from the reaction mixture as a precipitate in the second stage of the process of the invention but, as discussed above, can be allowed to remain during the final stage.

The hydrochloride is isolated by filtration, centrifugation, or like conventional procedures or by dissolution in water (by use of a water washing step) as a preliminary step in working up the final reaction product. The recovered amine hydrochloride can be then treated with alkali metal hydroxide, or by the like procedures, to liberate further quantities of alkylamine for reuse as starting material in the process of the invention.

The desired alkyl isothiocyanate is recovered from the reaction mixture obtained in the final stage of the process of the invention by conventional procedures. For example, after purging the mixture with an inert gas such as nitrogen, carbon dioxide, argon and the like to remove any carbonyl sulfide and hydrogen chloride still present in the reaction mixture and reaction vessel, and subjecting the residue to filtration, centrifugation or like procedures to remove the precipitated amine hydrochloride as described above, the remaining solution of alkyl isothiocyanate in inert organic solvent can be separated conveniently by fractional distillation. Judicious selection of the inert organic solvent so that its boiling point differs significantly (i.e. by the order of at least 30° C.) from that of the desired isothiocyanate, enables this separation to be carried out readily. The alkyl isothiocyanate so obtained can be purified, if desired, by procedures conventional in the art, for example, by fractional distillation, chromatography, countercurrent distribution and the like.

The process of the invention provides a very convenient method of converting an alkylamine to the corresponding isothiocyanate in good overall yield in a manner which is readily adapted to manufacture on a large scale. Thus, even though the reaction involves three stages, there is no need for isolation of intermediates at any stage and all three stages can be accomplished in a a single vessel with consequent saving in labor and equipment. In addition the alkyl isothiocyanate produced by the process of the invention is readily isolated from the reaction mixture and no complex separation of desired isothiocyanate from other reaction by-products is necessary.

The alkyl isothiocyanates which are produced according to the process of the invention are well-known compounds which are known to be useful for a variety of purposes. For example, they can be employed either alone, or in combination with other known nematocidal agents, in the control of soil nematodes, for example, using the procedures and formulations described in U.S. Patent 3,154,467 for the preparation of synergistic nematocidal mixtures of alkyl isothiocyanates and 1,4-dichloro-2-butene, 1,3-dichloro-2-butene and 1,4-dichloro-2-butyne. The alkyl isothiocyanates particularly those which contain at least 6 carbon atoms, can be employed as insecticides, particularly in the control of soft-bodied insects such as aphids, domestic flies and the like, in accordance with procedures and formulations such as those set forth in U.S. Patent 1,993,040.

The following examples describe the manner and process of making and using the invention and set forth the best mode contemplated by the inventor of carrying out the invention but are not to be construed as limiting.

Example 1

An excess of gaseous methylamine was passed into a stirred solution of 380 g. (5 moles) of carbon disulfide in 3800 ml. of benzene over a period of 70 minutes. The initial temperature of 13° C. in the mixture rose to a maximum of 35° C. at the end of the addition. When the addition was complete the solid which had separated was isolated by filtration, washed with benzene, and dried. There was thus obtained 676.5 g. of the methylamine salt of N-methyldithiocarbamic acid. A suspension of 621 g. of said salt in 3.5 litres of methylenechloride was stirred and maintained at 5 to 10° C. while a total of 480 g. (4.8 moles) of phosgene was added over a period of 4 hrs. The resulting mixture was heated under reflux for approximately 5.5 hrs. before being purged with nitrogen (1 hr.) and filtered to remove methylamine hydrochloride. The filtrate was evaporated to dryness and the residue was distilled to obtain 164.6 g. (50.1% theoretical yield) of methyl isothiocyanate having a boiling point of 117 to 118° C. and a melting point of 35 to 36° C.

Example 2

A total of 105 ml. (1 mole) of a 30% w./w. aqueous solution of methylamine was added slowly with stirring and cooling (reaction temperature maintained below 20° C.) to 43 g. (0.5 mole) of carbon disulfide. The solid which separated was isolated by filtration and dried. A mixture of 26.1 g. (0.22 mole) of the material so prepared in 130 ml. of methylene dichloride was cooled in ice and treated dropwise with stirring with a solution of 24 g. (0.24 mole) of phosgene in 80 ml. of methylene chloride. The addition was complete in 1 hr. 28 minutes at the end of which time the mixture was heated under reflux for 50 minutes. The resulting mixture was purged with nitrogen for 43 minutes to remove excess methylamine. The mixture so obtained was cooled at 5° C. and stirred while a total of 150 g. (1.5 moles) of phosgene was passed into the mixture at a temperature of 5–9° C. The resulting product was then heated under reflux for 2 hrs. before being purged with nitrogen at reflux for 30 min. The mixture so obtained was cooled to 25° C. and filtered to remove methylamine hydrochloride. The filtrate was evaporated to dryness and the residue was distilled to obtain 82.1 g. (56.2% theoretical yield) of methyl isothiocyanate, boiling point 117–118° C., melting point 35–36° C.

Example 3

A mixture of 315 parts by weight of carbon disulfide and 2997 parts by weight of methylene chloride was stirred and cooled while a total of 256 parts by weight of methylamine was added in the gaseous state. The temperature of the reaction mixture was maintained at 15 to 25° C. during the addition of the methylamine. When the addition was complete the reaction mixture was cooled to 3° C. and stirred while a total of 464 parts by weight of phosgene was added. The temperature during the phosgene addition was maintained within the range of 3° to 9° C. The mixture so obtained was then heated slowly to reflux temperature and maintained thereat for 3 hours. At the end of this time the reaction mixture was cooled to approximately 25° C. before adding 800 parts by weight of water to dissolve the precipitated methylamine hydrochloride. The mixture so obtained was agitated for 10 minutes before separating the organic (lower) layer and distilling the latter layer to remove methylene chloride and traces of water. The residue of methyl isothiocyanate was distilled and that fraction having a boiling point of 115° C. to 122° C. was collected. There was thus obtained 212 parts by weight of methyl isothiocyanate in the form of a white solid having a melting point of 35 to 36° C.

Example 4

A mixture of 76 g. (1.0 mole) of carbon disulfide and 800 ml. of benzene was stirred and cooled at about 15° C. while a total of 146 g. (2.0 mole) of n-butylamine was added dropwise. When the addition was complete the mixture was stirred for a further 30 minutes before cooling to about 5° C. The reaction mixture was maintained at this temperature while a total of 120 g. (1.2 moles) of phosgene was added over a period of 120 minutes. The mixture so obtained was heated slowly to reflux and maintained at that temperature for 2 hours before being purged with nitrogen for 45 minutes. The resulting mixture was cooled to approx. 25° C. and filtered to remove butylamine hydrochloride. The filtrate was evaporated to dryness and the residue was distilled under reduced pressure. There was thus obtained 89.1 g. (78.5% theoretical yield) of n-butyl isothiocyanate having a boiling point of 64 to 66° C. at a pressure of 18 mm. of mercury.

Example 5

Using the procedure described in Example 4 but replacing butylamine by sec-butylamine there is obtained sec-butyl isothiocyanate.

Similarly, using the procedure described in Example 4, but replacing n-butylamine by isopropylamine, hexylamine, 2-methylhexylamine, octylamine, decylamine or dodecylamine, there are obtained isopropyl isothiocyanate, hexyl isothiocyanate, 2-methylhexyl isothiocyanate, octyl isothiocyanate, decyl isothiocyanate, and dodecyl isothiocyanate, respectively.

I claim:
1. A process for the preparation of an alkyl isothiocyanate, wherein alkyl is from 1 to 12 carbon atoms, inclusive, which comprises reacting the corresponding alkylamine with carbon disulfide in the presence of an inert organic solvent at a temperature below 50° C., the molar ratio of alkylamine to carbon disulfide employed in said reaction being approximately 2:1, treating the reaction product so obtained with phosgene at a temperature of about 0° C. to about 20° C., the amount of phosgene employed being within the range of about 1.0 to about 1.2 moles for each 2 moles of alkylamine employed in the first step, and heating the reaction product so obtained at a temperature within the range of about 40° C. to about 120° C. to obtain the corresponding alkyl isothiocyanate.

2. In a process for the preparation of an alkyl isothiocyanate wherein alkyl is from 1 to 12 carbon atoms, inclusive, which comprises reacting the alkylamine salt of N-alkyldithiocarbamic acid, the alkyl residues of the latter corresponding to the alkyl residue of the isothiocyanate, with phosgene at a temperature of the order of about 0° C. to about 20° C., the amount of phosgene employed being within the range of about 1.0 to 1.2 moles per mole of amine salt employed as starting material, and heating the reaction mixture so obtained at a temperature of about 40° C. to about 120° C. to obtain the corresponding alkyl isothiocyanate.

3. The process of claim 2 wherein the phosgenation is carried out in the presence of an inert organic solvent.

4. In a process for the preparation of methyl isothiocyanate the steps which comprise reacting methylamine N-methyldithiocarbamate with phosgene at a temperature of the order of about 0° C. to about 20° C., the amount of phosgene employed being within the range of about 1.0 to about 1.2 moles per mole of the methylamine N-methyldithiocarbamate, and heating the reaction mixture so obtained at a temperature of about 40° C. to about 120° C. to obtain methyl isothiocyanate.

5. The process of claim 4 wherein the phosgenation is carried out in the presence of an inert organic solvent.

6. The process of claim 4 wherein the methylamine N-methyldithiocarbamate is produced in situ by reacting carbon disulfide and methylamine in the presence of an inert organic solvent at a temperature below 50° C. the methylamine being employed in the proportion of about 2 moles per mole of carbon disulfide.

7. The process of claim 4 wherein the methylamine N-methyldithiocarbamate is produced by reacting carbon disulfide with an aqueous solution of methylamine at a temperature below 50° C. the methylamine being employed in a proportion of about 2 moles for each mole of carbon disulfide.

8. A process for the preparation of methyl isothiocyanate which comprises reacting carbon disulfide with methylamine in the molar proportion of about 1:2, respectively, in the presence of an insert solvent at a temperature below 50° C., reacting the methyl N-methyldithiocarbamate so obtained with phosgene at a temperature of about 0° C. to about 20° C., the phosgene being employed in a proportion of about 1.0 to about 1.2 moles per mole of amine salt, and heating the reaction product so obtained at a temperature within the range of about 40° C. to about 120° C. until evolution of gas ceases, to obtain methyl isothiocyanate.

9. In a process for the preparation of butyl isothiocyanate the steps which comprise reacting butylamine N-butyldithiocarbamate with phosgene at a temperature of the order of about 0° C. to about 20° C., the amount of phosgene employed being within the range of about 1.0 to about 1.2 moles per mole of the butylamine N-butyldithiocarbamate and heating the reaction mixture so obtained at a temperature of about 40° C. to about 120° C. to obtain n-butyl isothiocyanate.

10. The process of claim 9 wherein the phosgenation is carried out in the presence of an inert organic solvent.

11. The process of claim 9 wherein the butyl N-butyldithiocarbamate is produced in situ by reacting carbon disulfide and butylamine in the presence of an inert organic solvent at a temperature below 50° C. the butylamine being employed in the proportion of about 2 moles per mole of carbon disulfide.

12. A process for the preparation of butyl isothiocyanate which comprises reacting carbon disulfide and butylamine in the molar proportion of about 1:2 respectively, in the presence of an inert solvent at a temperature below 50° C., reacting the butyl N-butyldithiocarbamate so obtained with phosgene at a temperature of about 0° C. to about 20° C., the phosgene being employed in a proportion of about 1.0 to about 1.2 moles per mole of amine salt, and heating the reaction product so obtained at a temperature within the range of about 40° C. to about 120° C. until evolution of gas ceases, to obtain butyl isothiocyanate.

References Cited

UNITED STATES PATENTS

| | | | |
|---|---|---|---|
| 2,548,741 | 4/1951 | Sayre | 260—454 |
| 2,827,483 | 3/1958 | Fischback et al. | 260—454 XR |
| 2,894,013 | 7/1959 | Werres | 260—454 |
| 2,898,363 | 8/1959 | Nischk | 260—454 |

CHARLES B. PARKER, *Primary Examiner.*

D. H. TORRENCE, *Assistant Examiner.*